United States Patent
Van Grootheest et al.

(10) Patent No.: US 6,382,135 B1
(45) Date of Patent: May 7, 2002

(54) PIG PEN

(76) Inventors: Eric Van Grootheest; Annette Van Grootheest, both of R.R.#2, Alma, Ontario (CA), N0B 1A0

( * ) Notice: Subject to any disclaimer, the term of this patent is extended or adjusted under 35 U.S.C. 154(b) by 0 days.

(21) Appl. No.: 09/870,677

(22) Filed: Jun. 1, 2001

(51) Int. Cl.$^7$ ................................. A01K 1/02
(52) U.S. Cl. ................. 119/446; 119/445; 119/503; 119/506; 119/507; 119/505
(58) Field of Search ................. 119/446, 421, 119/436, 444, 445, 492, 503, 506, 505, 507, 509; D30/119

(56) References Cited

U.S. PATENT DOCUMENTS

| | | | |
|---|---|---|---|
| 3,941,093 A | * 3/1976 | Sievers et al. | 119/20 |
| 4,269,146 A | * 5/1981 | Lindenman | 119/16 |
| 4,287,855 A | * 9/1981 | Gibson | 119/20 |
| 4,351,272 A | * 9/1982 | McDonald | 119/20 |
| 5,111,769 A | * 5/1992 | Proctor | 119/20 |
| 5,293,834 A | 3/1994 | Keuter | |
| D351,260 S | 10/1994 | Taylor et al. | |
| 5,809,937 A | 9/1998 | Hurnik et al. | |

* cited by examiner

*Primary Examiner*—Charles T. Jordan
*Assistant Examiner*—Danielle Rosenthal
(74) *Attorney, Agent, or Firm*—R. Craig Armstrong (57) ABSTRACT

A pig pen has side walls joined together by end walls to form a substantially rectangular enclosure. An angled divider is pivotable inside the pen, having a first end pivotably arranged on a pivot on one end wall and second end attachable to any one of a plurality of mounts on the opposite end wall. The divider has a first straight portion joined at an angle to a second straight portion, and a lower bar attached with one end adjacent the first end and an opposite end adjacent the second end of the divider. The lower bar is shorter than the total length of the divider and arranged below it, to break the fall of a sow lying down on her side adjacent the divider to provide time for any piglets close to the sow to move away from the sow.

12 Claims, 8 Drawing Sheets

PIG PEN

BACKGROUND OF THE INVENTION

1. Field of the Invention

This invention relates to a pig pen for use prior to and during farrowing and nursing of piglets.

2. Description of the Prior Art

Pig pens used for the farrowing and during nursing periods are known. They generally divide the pen area into a farrowing area, where the sow is confined, and creep areas for the piglets. Traditionally, adjustable farrowing pens have utilized side finger bars, which have been horizontally pivotable into several space configurations of the pen, creating separate spaces for the sow and the piglets, the piglets having access to the sow's space but the sow not having access to the piglet's space. In this pen, the sow can be given a maximum amount of space until farrowing occurs, whereafter the space for the sow is decreased and the space for the piglets is correspondingly increased. One example of a pig pen of this type is described in U.S. Pat. No. 5,293,834. A pen is shown, having two pivotable finger bars, each independently pivotable and securable to the end wall. One finger bar is angled, having a first straight portion and a second straight portion at an angle. Apparent disadvantages with this type of pig pen is that it is of complicated construction, which translates to higher manufacturing costs, and there are no safe-guards for preventing the sow from crushing piglets when she lies down for feeding. The sow frequently "flops down" hard onto her side, endangering any piglets that are caught underneath her.

SUMMARY OF THE INVENTION

It is an object of the invention to mitigate and/or obviate the above mentioned disadvantages to provide a pig pen which maximizes the use of the available pen space whilst providing protection against the sow lying down onto any piglets adjacent the finger bar and which pen further provides easy access for a pig caretaker.

A pig pen according to the invention comprises:

a first side wall spaced-apart from a second side wall, the first and second side walls joined together by a first end wall and a second end wall to form a substantially rectangular enclosure;

a substantially flat floor;

a gate in the first end wall;

a divider, having a first end pivotably arranged on a pivot on the first end wall and a second end attachable to any one of a plurality of mounts on an inner end wall arranged between the first end wall and the second end wall adjacent the second end wall, so that the divider divides the pig pen into a first space accessible via the gate and a second substantially L-shaped space. The divider further has a lower bar attached with one end adjacent the first end and an opposite end adjacent the second end of the divider, the lower bar protruding a preset distance from the divider, in a direction towards the first space, the lower bar arranged below the divider, to break the fall of a sow lying down on her side adjacent the divider to provide time for any piglets close to the sow to move away from the sow.

Advantageously, the divider has a first straight portion joined at an angle to a second straight portion, and the lower bar generally follows the angled contour of the divider. Preferably, the first straight portion is substantially longer than the second straight portion and the first straight portion is connected to the pivot on the first end wall.

Preferably, a distance between the first end wall and the inner end wall, defining the length of the first space, is shorter than a distance between the first end wall and the second end wall, and a distance between the divider and the second side wall, defining the width of the first space, is shorter than a distance between the first side wall and the second side wall, to allow access around three sides of the pig pen, when the pig pen is installed together with further pig pens of the same construction in a common space. Most preferably, the length of the first space is between 70" and 75", and the width of the first space is between 45" and 50".

Advantageously, the lower bar is arranged at a height from the floor of between 10" and 12". Most preferably, the lower bar is arranged at a height from the floor of 11.5".

The pig pen further advantageously has a substantially horizontal bar arranged on the second side wall, the horizontal bar protruding out from the second side wall, to prevent the sow from lying down with her back against the side of the pig pen. The horizontal bar is preferably arranged at a height from the floor of between 6" and 9", and the horizontal bar protrudes from the second side wall a distance between 7" and 9". Most preferably, the horizontal bar is arranged at a height of 7" from the floor and the horizontal bar protrudes 8.5" from the second side wall.

Advantageously, the first end wall and the inner end wall are between 38" and 42" high, measured from the floor to a top of the first end wall and a top of the inner end wall. Most preferably, the first end wall and the inner end wall are 40" high.

Further features of the invention will be described or will become apparent in the course of the following detailed description.

BRIEF DESCRIPTION OF THE DRAWINGS

In order that the invention may be more clearly understood, the preferred embodiment thereof will now be described in detail by way of example, with reference to the accompanying drawings, in which.

DETAILED DESCRIPTION OF THE PREFERRED EMBODIMENT

Referring to FIGS. 1A to 5, a pig pen 1 according to the invention has a first side wall 2 spaced-apart from a second side wall 2' and the side walls are joined together by a first end wall 3 and a second end wall 4, to form a substantially rectangular enclosure. Further, the pen has a substantially flat floor 5 and a gate 6 in the first end wall, for access to the inside of the enclosure. An angled divider 7, having a first end 8 pivotably arranged on a pivot 9 on the first end wall 3 and second end 10 attachable to any one of a plurality of mounts 11 on an inner end wall 4' arranged between the first end wall and the second end wall adjacent the second end wall. The divider thus divides the pig pen into a first space S accessible via the gate and a second substantially L-shaped space P, and the relative sizes of the first space and the second space can be altered by pivoting the divider. The divider advantageously has a first straight portion 12 joined at an angle α to a second straight portion 13, so that the divider is curved or bent.

The divider 7 further has a lower bar 14 attached with one end 15 adjacent the first end 8 and an opposite end 16 adjacent the second end 10 of the divider. The lower bar is shorter than the total length of the divider and arranged below the divider, so that it runs inside the curvature or angle of the divider. The purpose of the lower bar 14 is to break the fall of a sow lying down on her side adjacent the divider to thus provide time for any piglets close to the sow to move away before being squished by the sow. In the case a straight divider is used, the lower bar has to run a certain distance inside the divider, to achieve the same effect.

Figure 1A:
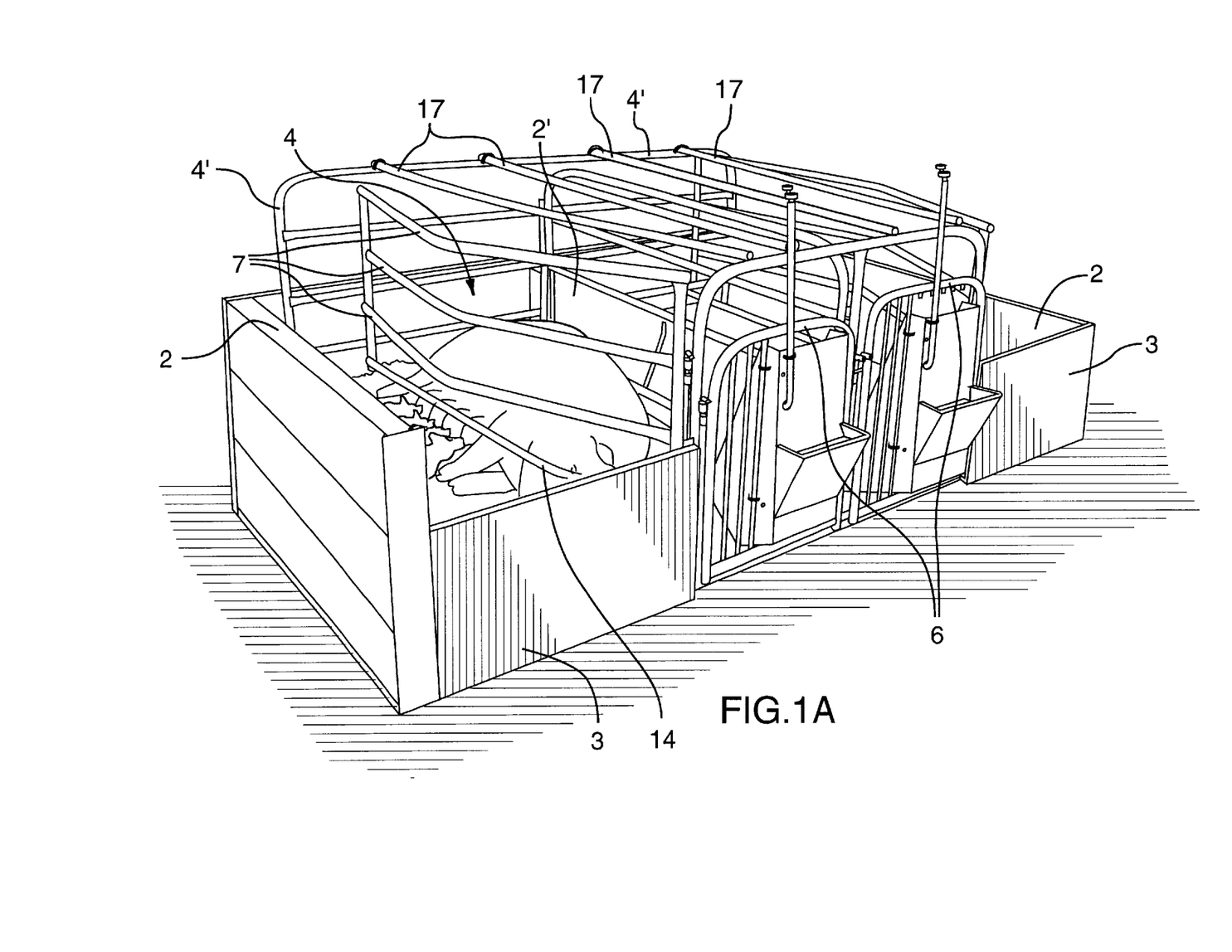
FIG. 1A is an elevational perspective view of a pig pen according to the invention, showing a double pig pen.
Figure 1B:
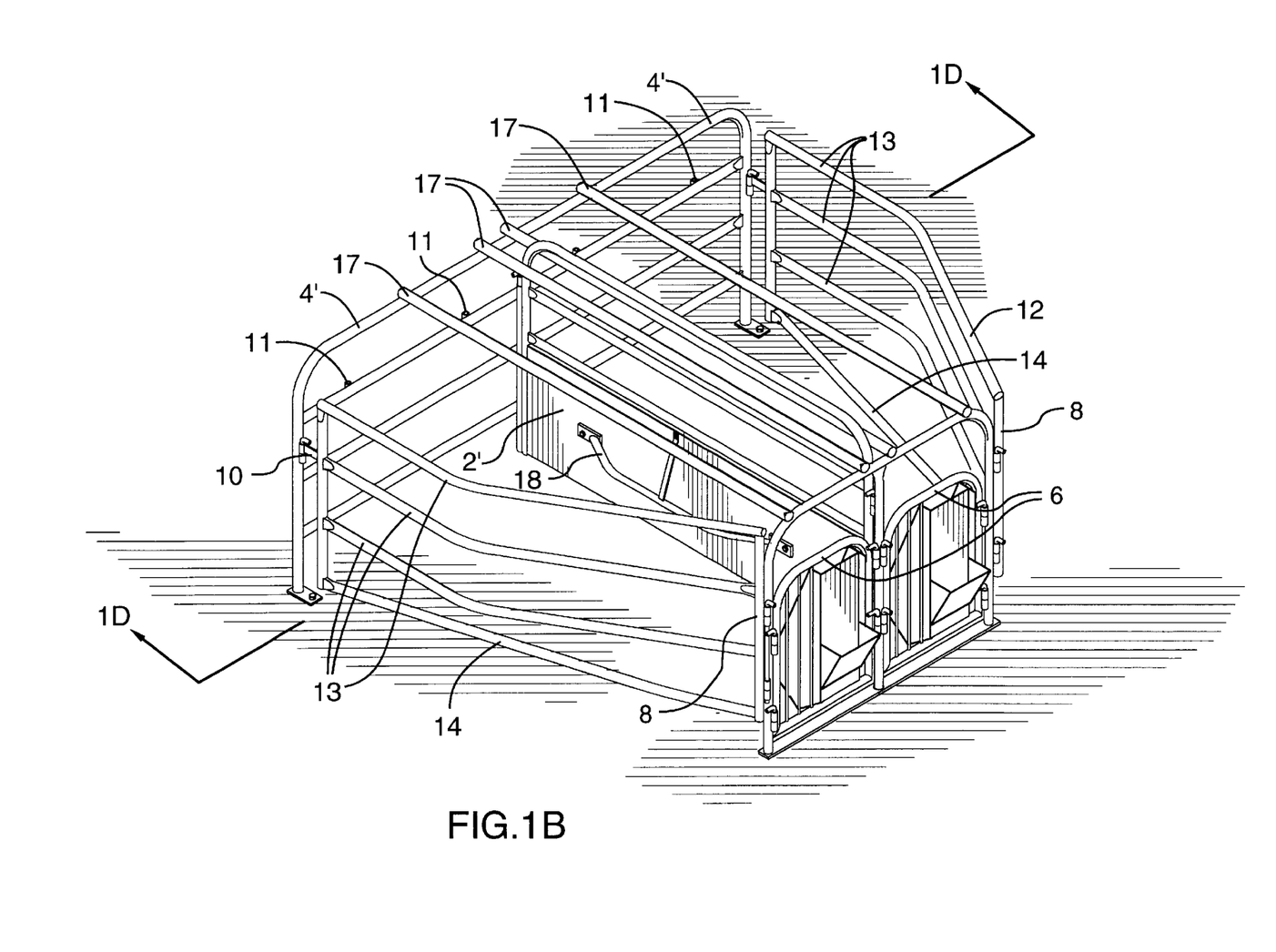
FIG. 1B is an elevational perspective view of the barwork of the double pig pen shown in FIG. 1A.
Figure 1C:
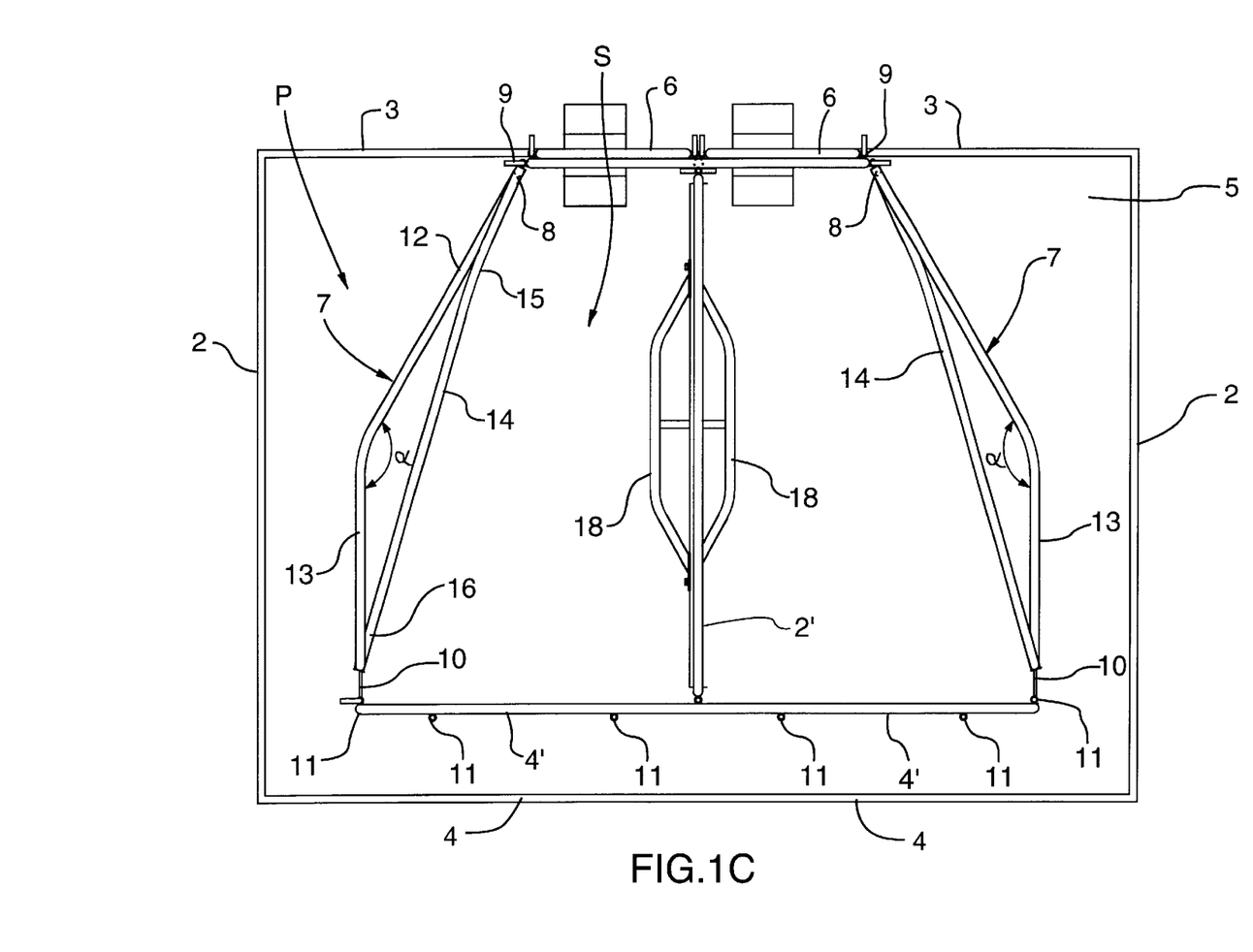
FIG. 1C is a top view of the double pig pen shown in FIG. 1A.
Figure 1D:
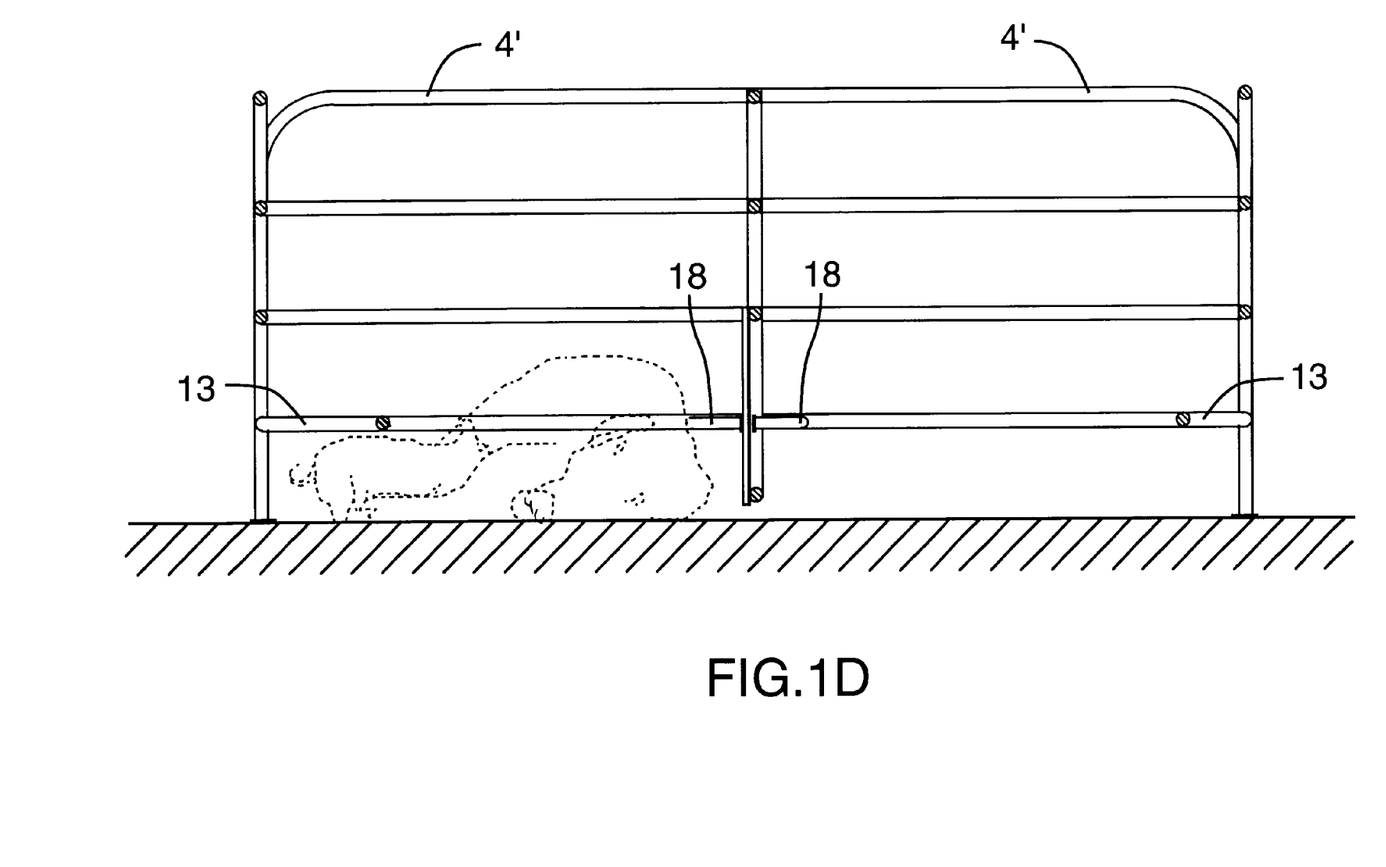
FIG. 1D is an end view of the double pig pen seen from the line 1D—1D of FIG. 1B, showing the end wall opposite the entrance gate.
Figure 1E:
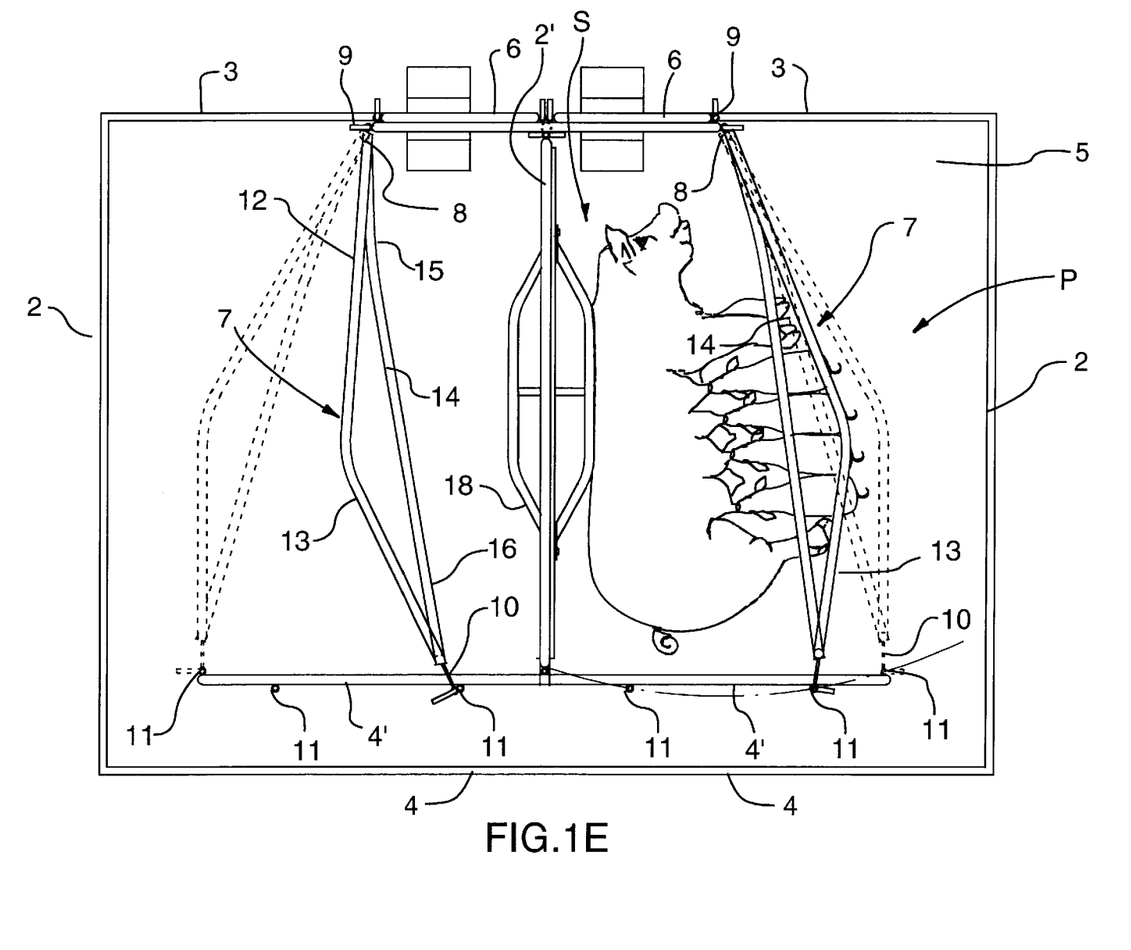
FIG. 1E is a top view of the double pig pen shown in FIG. 1A, showing a sow occupying one of the pig pens and feeding her piglets.
Figure 2:
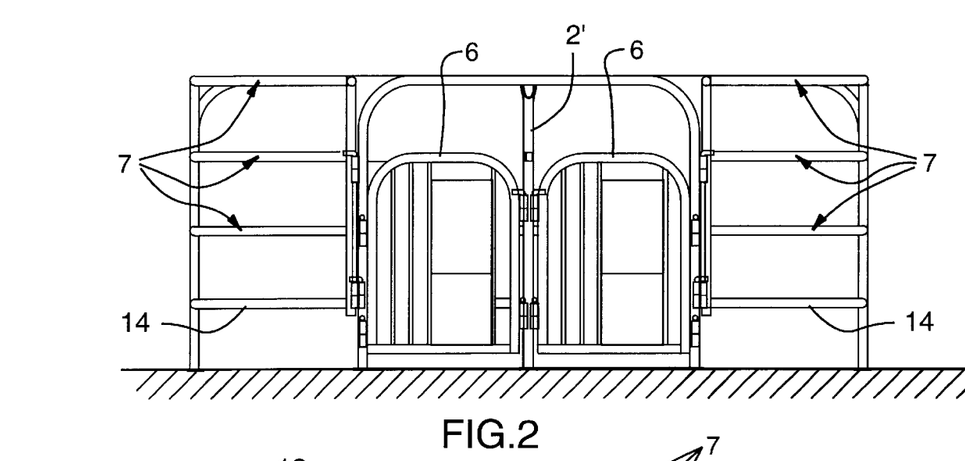
FIG. 2 is an end view of the double pig pen shown in FIG. 1A, showing the end wall having the entrance gate.
Figure 3:
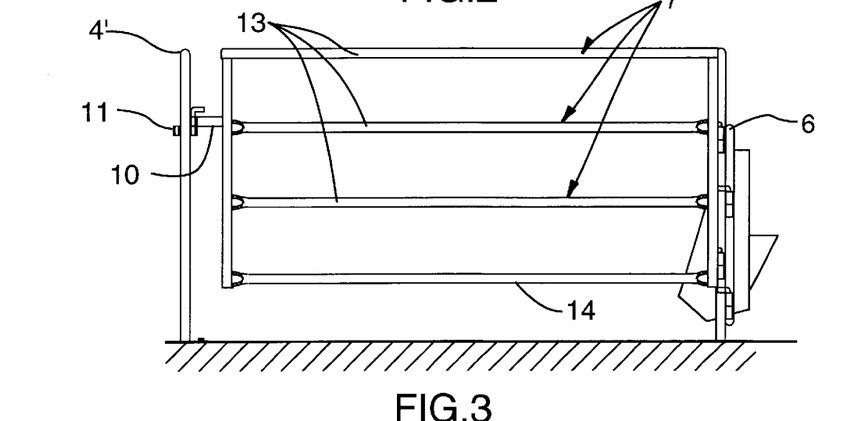
FIG. 3 is a side view of the double pig pen shown in FIG. 1A, showing the outer side of the pig pen.
Figure 4A:
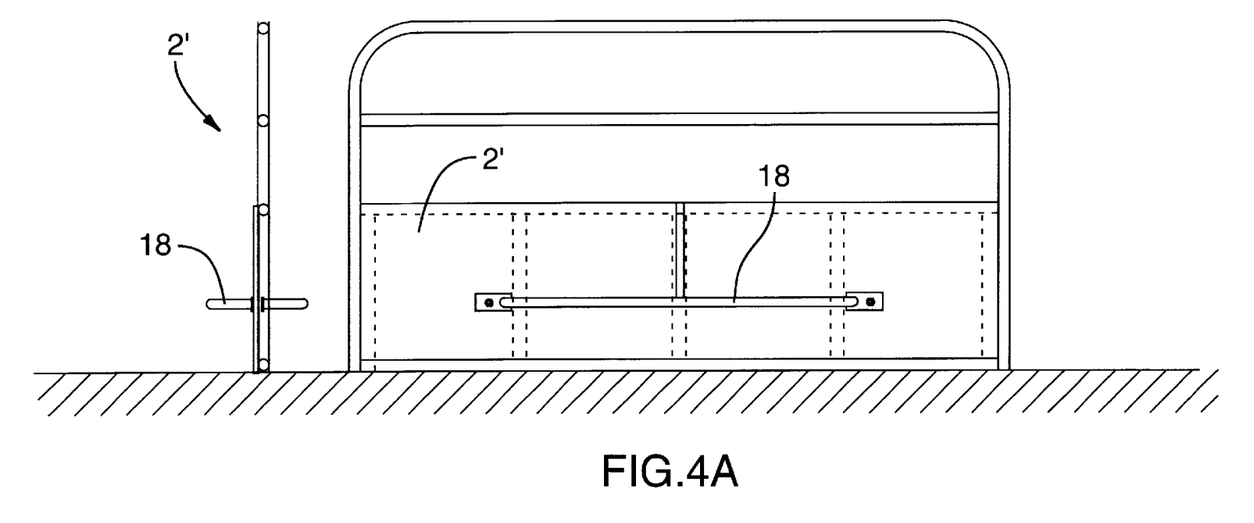
FIG. 4A is a side view of the double pig pen shown in FIG. 1A, showing the shared inner side wall between two adjacent pig pens of the double.
Figure 4B:
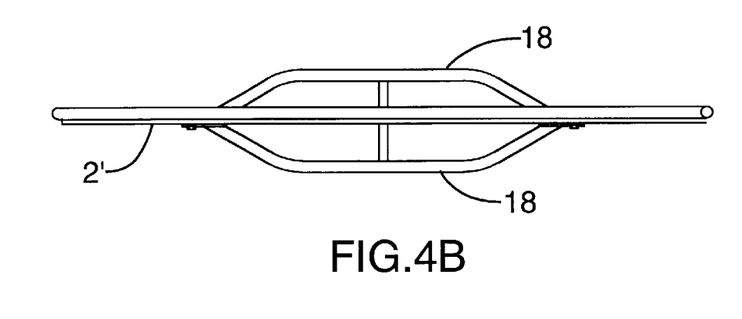
FIG. 4B is a top view of the inner side wall shown in FIG. 4A.

The divider 7 is thus pivotable and securable in different positions relative the side walls 2 of the pig pen 1 (see FIG. 1E). In the extreme position where the divider is pivoted as far as possible towards the side wall closest to the gate, the sow has a minimum of space at her disposal, the space being adjacent the side wall closes to the gate. In this position, a caretaker has access to almost the entire pig pen and can thus reach all the piglets. In a intermediate position, the divider is set to give the sow more space and this is the position the divider will be in when the sow has nursing piglets. The pig pen area disposable for the sow is increased approx. 5 days after farrowing, to the intermediate position of the divider. When the divider is in an extreme position, where the divider is pivoted as far as possible towards the side wall opposite the side wall closest to the gate, the sow has a maximum of space at her disposal. This position is used once the piglets are 7 to 10 m days old. The mounts 11 on the inner end wall 4' are preferably arranged along a circular path, to allow for the circular pat swing of the divider 7. Alternatively, the divider can be telescopic, to adjust its length according to which mount is being used, the mounts can then be arranged along a substantially straight line on the end wall.

The pig pen 1 further has traditional top bars 17 attached between the first end wall 3 and the inner end wall 4', or alternatively between the first side wall 2, to prevent the sow to jump out of the pen.

The first straight portion 12 of the divider 7 is advantageously substantially longer than the second straight portion 13, to define a suitably narrowing space withing the pen for accommodating the sow in the different stages of pen use. The first straight portion is connected to the pivot 9 on the first end wall 3.

Figure 5:
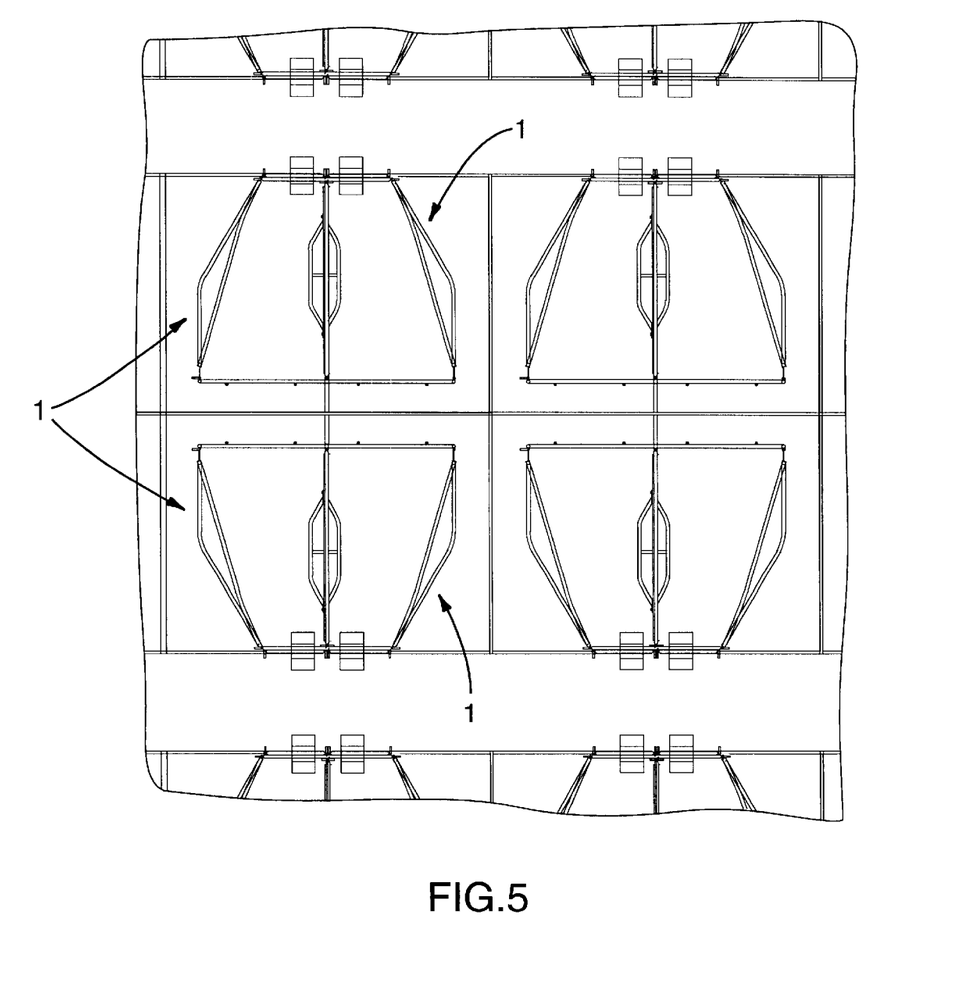
FIG. 5 is a top view of a plurality of double pig pens as shown in FIG. 1A making up a pig pen installation in a barn, for instance.

The distance between the first end wall 3 and the inner end wall 4' defines the length of the first space S and is preferably shorter than the standard pig pen length of 7'4", and the width of the first space is similarly preferably shorter than the standard pig pen width of 5', to allow access around three sides of the pig pen, when the pig pen is installed together with further pig pens of the same construction in a common space (see FIG. 5). The preferred length of the first space S is between 70" and 75", and the preferred width of the first space is between 45" and 50".

The lower bar 14 is advantageously arranged at a height from the floor 5 of between 10" and 12", most preferably at 11.5".

The pig pen 1 further preferably has a substantially horizontal bar 18 arranged on the second side wall 2', the horizontal bar protruding a certain distance out from the second side wall, to prevent the sow from lying down with her back against the side of the pig pen and thus endanger the piglets from being squeezed against the wall. Preferably, the horizontal bar is arranged at a height from the floor 5 of between 6" and 9", and the horizontal bar protrudes from the second side wall 2' between 7" and 9", most preferably the horizontal bar is arranged at a height of 7" from the floor and the horizontal bar protrudes 8.5" from the second side wall.

Advantageously, the first end wall 3, the inner end wall 4', the divider 7 and the second side wall 2' are between 38" and 42" high, measured from the floor 5 to a top of the first end wall etc., most preferably the first end wall, the inner end wall, the divider and the second side wall are 40" high.

Two pig pens 1 according to the invention are advantageously, but not exclusively, arranged with the second side wall 2' being shared by the two pens and the access gates 6 facing the same direction (see FIGS. 1A to 1E, 2, 4A and 4B). By doing this, the space of a conventional pig pen (usually 7'4" by 5') is utilized most efficiently, providing access to three sides around the combination double pig pen setup, and the cost of the pig pen construction can be lowered. A traditional pig pen typically only provides access to one or possibly two sides, for a pen in-between other pens. The pig pen concept of the invention, utilizing the double pen arrangement described, is shown in a typical barn setup in FIG. 5. From this top view is obvious that the pig caretaker has easy access to a large portion of each pen, without having to enter the space occupied by the sows.

It will be appreciated that the above description relates to the preferred embodiment by way of example only. Many variations on the invention will be obvious to those knowledgeable in the field, and such obvious variations are within the scope of the invention as described and claimed, whether or not expressly described.

What is claimed as the invention is:

1. A pig pen comprising:
   a first side wall spaced-apart from a second side wall, said first and second side walls joined together by a first end wall and a second end wall to form a substantially rectangular enclosure;
   a substantially flat floor;
   a gate in said first end wall;
   a divider, having a first end pivotably arranged on a pivot on said first end wall and a second end attachable to any one of a plurality of mounts on an inner end wall arranged between said first end wall and said second end wall adjacent said second end wall, so that said divider divides said pig pen into a first space accessible via said gate and a second substantially L-shaped space;
wherein said divider further has a lower bar attached with one end adjacent said first end and an opposite end adjacent said second end of said divider, said lower bar protruding a preset distance from said divider, in a direction towards said first space, said lower bar arranged below said divider, to break the fall of a sow lying down on her side adjacent said divider to provide time for any piglets close to the sow to move away from the sow.

2. The pig pen as recited in claim 1, wherein said divider has a first straight portion joined at an angle to a second straight portion, and said lower bar generally follows the angled contour of said divider.

3. The pig pen as recited in claim 2, wherein said first straight portion is substantially longer than said second straight portion and said first straight portion is connected to said pivot on said first end wall.

4. The pig pen as recited in claim 3, wherein a distance between said first end wall and said inner end wall, defining the length of said first space, is shorter than a distance between said first end wall and said second end wall, and a distance between said divider and said second side wall, defining the width of said first space, is shorter than a distance between said first side wall and said second side wall, to allow access around three sides of said pig pen, when said pig pen is installed together with further pig pens of the same construction in a common space.

5. The pig pen as recited in claim 4, wherein said length of said first space is between 70" and 75", and said width of said first space is between 45" and 50".

6. The pig pen as recited in claim 1, wherein said lower bar is arranged at a height from said floor of between 10" and 12".

7. The pig pen as recited in claim 6, wherein said lower bar is arranged at a height from said floor of 11.5".

8. The pig pen as recited in claim 1, wherein said pig pen further has a substantially horizontal bar arranged on said second side wall, said horizontal bar protruding out from said second side wall, to prevent the sow from lying down with her back against said side of said pig pen.

9. The pig pen as recited in claim 8, wherein said horizontal bar is arranged at a height from said floor of between 6" and 9", and said horizontal bar protrudes from said second side wall a distance between 7" and 9".

10. The pig pen as recited in claim 9, wherein said horizontal bar is arranged at a height of 7" from said floor and said horizontal bar protrudes 8.5" from said second side wall.

11. The pig pen as recited in claim 1, wherein said first end wall and said inner end wall are between 38" and 42" high, measured from said floor to a top of said first end wall and a top of said inner end wall.

12. The pig pen as recited in claim 11, wherein said first end wall and said inner end wall are 40" high.

* * * * *